United States Patent
Kobayashi

(10) Patent No.: US 8,453,004 B2
(45) Date of Patent: May 28, 2013

(54) MICROCOMPUTER WITH RESET PIN AND ELECTRONIC CONTROL UNIT WITH THE SAME

(75) Inventor: Toshimasa Kobayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 1359 days.

(21) Appl. No.: 11/812,809

(22) Filed: Jun. 21, 2007

(65) Prior Publication Data

US 2008/0126774 A1 May 29, 2008

(30) Foreign Application Priority Data

Jun. 21, 2006 (JP) .................................. 2006-171733

(51) Int. Cl.
*G06F 1/04* (2006.01)

(52) U.S. Cl.
USPC ........................................................ 713/500

(58) Field of Classification Search
USPC ........................................................ 713/500
See application file for complete search history.

(56) References Cited

U.S. PATENT DOCUMENTS

| | | | | |
|---|---|---|---|---|
| 5,243,637 A | * | 9/1993 | Flaherty et al. | 377/95 |
| 5,774,701 A | * | 6/1998 | Matsui et al. | 713/501 |
| 5,844,435 A | * | 12/1998 | Grundvig | 327/151 |
| 6,255,882 B1 | * | 7/2001 | Hirai | 327/291 |
| 6,307,480 B1 | | 10/2001 | Sheldon et al. | |
| 6,349,391 B1 | * | 2/2002 | Petivan et al. | 714/11 |
| 6,400,195 B1 | | 6/2002 | Bhaskaran | |

FOREIGN PATENT DOCUMENTS

| | | |
|---|---|---|
| JP | 04-349516 | 12/1992 |
| JP | 05-094226 * | 4/1993 |
| JP | 9-146913 | 6/1997 |
| JP | 11-161629 | 6/1999 |
| JP | 2004-70722 | 3/2004 |

OTHER PUBLICATIONS

Extended European Search Report dated Jun. 17, 2009, issued in corresponding EP Application No. 07012096.9-2224.
Office Action dated Mar. 16, 2010 issued in corresponding Japanese Application No. 2006-171733.

* cited by examiner

*Primary Examiner* — Kim Huynh
*Assistant Examiner* — Eric Chang
(74) *Attorney, Agent, or Firm* — Nixon & Vanderhye P.C.

(57) ABSTRACT

In a microcomputer for executing at least one task in normal operation mode, a reset pin is provided. The microcomputer is configured to be reset upon a reset signal with an active level being inputted to the reset pin. A first clock generator is configured to generate a first clock with a first frequency. The microcomputer operates on the first clock as its operation clock. A disabling unit is electrically connected to the reset pin and configured to, upon the reset signal with the active level being input to the reset pin, disable the first clock generator.

10 Claims, 8 Drawing Sheets

MICROCOMPUTER WITH RESET PIN AND ELECTRONIC CONTROL UNIT WITH THE SAME

CROSS REFERENCE TO RELATED APPLICATIONS

This application is based on Japanese Patent Application 2006-171733 filed on Jun. 21, 2006. This application claims the benefit of priority from the Japanese Patent Application, so that the descriptions of which are all incorporated herein by reference.

FIELD OF THE INVENTION

The present invention relates to microcomputers having a reset pin and electronic control units equipped with a microcomputer with a reset pin.

BACKGROUND OF THE INVENTION

Conventional microcomputers have at least one reset pin (reset port) to which a reset signal for microcomputer reset is designed to be input. Specifically, the microcomputer is in shutdown state while the reset signal is in an active level, and is reset (rebooted) when the reset signal is turned from the active level to an inactive level.

On the other hand, when microcomputers need not control targets allocated thereby, they are programmed to operate in sleep mode as an example of low power consumption mode with low current drain as compared with in normal operation mode. Such a microcomputer operable in sleep mode is disclosed in, for example, Japanese Unexamined Patent Publication No. H09-146913.

Electronic devices equipped with such a microcomputer include electronic control units (ECUs) for vehicles.

In ECUs consisting of a microcomputer capable of operating in low power consumption mode, when a failure occurs in the microcomputer, the microcomputer is reset. When the microcomputer need not control targets allocated thereby, the operation mode of the microcomputer is configured to be shifted into low power consumption mode.

Specifically, in an ECU installed in a vehicle and consisting of a microcomputer capable of operating in low power consumption mode, the ECU is equipped with a power supply circuit operative to step down a battery voltage fed from a battery installed in the vehicle to thereby generate an operating voltage. The power supply circuit is operative to supply the operating voltage to the microcomputer.

When detecting that the operating state of the microcomputer is in abnormal, the power supply circuit works to turn a reset signal with an inactive level being input to the microcomputer to an active level. The power supply circuit also works to output, to the microcomputer, a control necessary/unnecessary signal indicative of the necessity of control for target devices allocated by the microcomputer depending on, for example, the on/off state of an ignition switch installed in the vehicle.

When the output level of the reset signal being input to the microcomputer is shifted from the inactive level to the active level, the microcomputer is reset. When the output level of the control necessary/unnecessary signal is shifted from a level representing the necessity of control for the target devices to that representing the unnecessity of control therefor, the microcomputer is shifted from normal operation mode into low power consumption mode.

In such a microcomputer with the reset function and the low power consumption mode shifting function, it is necessary to provide, to the microcomputer, at least one mode-control pin (port) via which the external control necessary/unnecessary signal can be input thereto independently of the reset pin via which the external reset signal can be input to the microcomputer.

In microcomputers used to be installed in ECUs, the greater the number of pins (ports) of a microcomputer is, the greater a package of the microcomputer is in size. This may deteriorate the installability of microcomputers in ECUs. For this reason, there are needs of users to reduce the number of pins of microcomputers as much as possible.

In order to address the user's requirements, no low power consumption mode pins can be provided to microcomputers, but in this method, they can not be shifted from normal operation mode into low power consumption mode. This may increase the current drain in microcomputers of ECUs installed in a vehicle, which may cause the life of the battery installed in the vehicle to be reduced.

SUMMARY OF THE INVENTION

In view of the background, an object of an aspect of the present invention is to provide a microcomputer with a reset pin, which is capable of reducing its current drain without providing, to the computer, at least one dedicated pin for reduction of the current drain.

According to a first aspect of the present invention, there is provided a microcomputer for executing at least one task in normal operation mode. The microcomputer includes a reset pin. The microcomputer is configured to be reset upon a reset signal with an active level being inputted to the reset pin. A first clock generator is configured to generate a first clock with a first frequency. The microcomputer operates on the first clock as its operation clock. A disabling unit is electrically connected to the reset pin and configured to, upon the reset signal with the active level being input to the reset pin, disable the first clock generator.

A preferred embodiment of a microcomputer according to the first aspect further includes a first determining unit configured to determine whether the microcomputer allows operation in low power consumption mode based on at least one of information associated with an operating condition of the microcomputer and information associated with an externally entered signal. A current drain required for the microcomputer to operate in the low power consumption mode being lower than a current drain required for the microcomputer to operate in normal operation mode. The preferred embodiment of the microcomputer according to the first aspect includes a shifting unit configured to shift the operation mode of the microcomputer from the normal operation mode into the low power consumption mode when it is determined that the microcomputer allows operation in the low power consumption mode.

According to a second aspect of the present invention, there is provided an electronic control unit includes a microcomputer recited in the first aspect of the invention. The microcomputer executes control of a target device as the at least one task. The electronic control unit includes a determining unit operatively connected to the microcomputer and configured to determine:

whether a malfunction occurs in the microcomputer; and whether the microcomputer needs to execute control of the target device based on at least one of information associated with an operating condition of the microcomputer and information associated with an externally entered signal.

The electronic control unit includes a reset-signal output unit electrically connected to the reset pin and configured to output the reset signal with the active level to the microcomputer via the reset pin at least one of when it is determined that the malfunction occurs in the microcomputer and when the microcomputer does not need to execute control of the target device.

According to a third aspect of the present invention, there is provided an electronic control unit. The electronic control unit includes a microcomputer recited in the preferred embodiment. The microcomputer executes control of a target device as the at least one task. The electronic control unit includes a second determining unit operatively connected to the microcomputer and configured to determine:

whether a malfunction occurs in the microcomputer; and
whether the microcomputer needs to execute control of the target device based on the determination result of the first determining unit of the microcomputer. The electronic control unit includes a reset-signal output unit electrically connected to the reset pin and configured to output the reset signal with the active level to the microcomputer via the reset pin at least one of when it is determined that the malfunction occurs in the microcomputer and when the microcomputer does not need to execute control of the target device.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Figure 1:
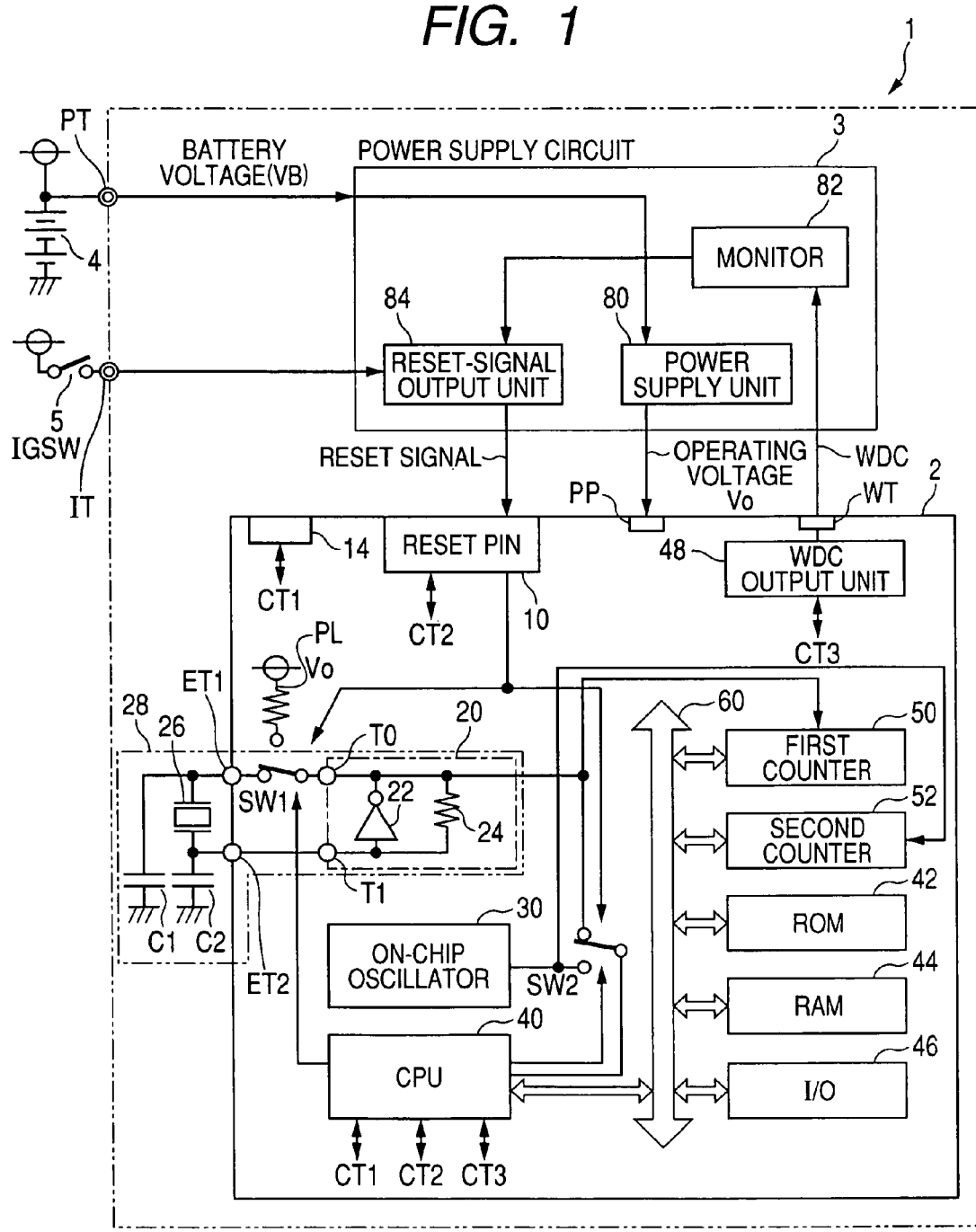
FIG. 1 is a block diagram schematically illustrating an example of the configuration of an electronic control unit according to a first embodiment of the present invention.

Embodiments of the present invention will be described hereinafter with reference to the accompanying drawings. In the drawings, identical reference characters are utilized to identify identical corresponding components.

First Embodiment

A first embodiment of the present invention will be described hereinafter with reference to FIGS. 1 to 6.

In the first embodiment, the present invention is applied to an ECU 1 installed in a vehicle for controlling target in-vehicle devices, such as an engine and/or an electronic throttle of the engine.

The ECU 1 includes a microcomputer 2 and a power supply circuit 3.

As illustrated in FIG. 1, the microcomputer 2 is composed of an oscillating unit 20 for outputting a main-clock consisting of a periodic series of clock pulses with a frequency (main clock frequency) on which the microcomputer 2 operates.

The microcomputer 2 is composed of an on-chip oscillator 30 for outputting a sub-clock consisting of a periodic series clock pulses whose frequency (sub clock frequency) is lower than the main clock frequency.

Note that the on-chip oscillator 30 is configured to continuously execute the sub-clock output operations when activated even if the oscillator circuit 28 is disabled, which will be described hereinafter. Thus, operations of the on-chip oscillator 30 are stable, which allows the amplitude and frequency of the sub-clock output from the on-chip oscillator 30 to be stable.

The microcomputer 2 is composed of a CPU 40 operating in accordance with various programs P, and a ROM, such as a flash ROM, 41 in which the various programs P that cause the CPU 40 to execute various tasks are stored in advance.

The microcomputer 2 is composed of a RAM 44 operative to temporarily store data representing processing results of the CPU 40, and an input/output (I/O) interface 46 operative to input/output signals to/from external devices including the target in-vehicle devices.

The microcomputer 2 is composed of an internal bus 60 communicably coupling the CPU 40, ROM 42, RAM 44, and the I/O interface 46 to each other. The microcomputer 2 is composed of a WDC (watchdog clear) output unit 48. The CPU 40 causes the WDC output unit 48 to periodically output a watchdog clear signal (WDC signal) to the power supply circuit 3.

The microcomputer 2 is composed of a first counter 50 electrically connected to the oscillating unit 20, and a second counter 52 electrically connected to the on-chip oscillator 30.

The first counter 50 is configured to count up or down by 1 every clock cycle of the main-clock. The second counter 52 is configured to count up or down by 1 every clock cycle of the sub-clock.

The microcomputer 2 is provided with at least one reset pin 10 to which a reset signal from the power supply circuit 3 is configured to be input. The reset pin 10 is electrically connected to the CPU 40.

The microcomputer 2 is provided with a plurality of input/output (I/O) ports 14 consisting of, for example, a plurality of pins. The plurality of I/O ports 14 are electrically connected to the I/O interface 46 so that they allow the external devices to be communicably coupled to the internal bus 60 of the microcomputer 2 such that the external devices can communicate with the CPU 40 via the I/O ports 14 and the I/O interface 46.

The oscillating unit 20 has an input terminal TI and an output terminal TO, and consists of an inverter 22 and a resistor 24. The output terminal TO of the oscillating unit 20 is connected to an output signal line L1 to which an output terminal of the inverter 22 and one end of the resistor 24 are electrically connected. The input terminal TI of the oscillating unit 20 is connected to an input signal line L2 to which an input terminal of the inverter 22 and the other end of the resistor 24 are electrically connected.

The microcomputer 2 is provided with first and second external pins ET1 and ET2, and with a first switch SW1. One end of the first switch SW1 is electrically connected to the output terminal TO, and the other end thereof is electrically connected to the first external pin ET1. The second external pin ET2 is electrically connected to the input terminal TI of the oscillating unit 20.

The ECU 1 is equipped with a resonator 26, such as a quartz resonator, or a ceramic resonator, a first capacitor C1, and a second capacitor C2.

One end of the resonator 26 is connected to the other end of the first switch SW1 via the first external pin ET1, which allows the one end of the resonator 26 to be electrically connected to the output terminal of the oscillating unit 20 (inverter 22) through the first switch SW1.

The one end of the resonator 26 is also electrically connected to one electrode of the first capacitor C1, and the other electrode thereof is electrically connected to a ground line.

The other end of the resonator 26 is electrically connected to the input terminal TI of the oscillating unit 20 via the second external pin ET2, which allows the other end of the resonator 26 to be continuously connected to the input terminal of the oscillating unit 20 (inverter 22).

The other end of the resonator 26 is electrically connected to one electrode of the second capacitor C2, and the other electrode thereof is connected to the ground line.

The resonator 26 and the first and second capacitors C1 and C2 constitutes a resonant circuit.

The arrangement of the elements 22, 24, 26, C1, and C2 and electrical connections there among allow them to constitute a parallel resonant oscillator circuit 28.

Specifically, in the oscillator circuit 28, the inverter 22 serves as an inverting amplifier in its linear region, and the resonator 26 serves as a tuned element in the feedback of the inverter 22 (inverter amplifier). A phase-shift compensation and gain control are provided by the capacitors C1 and C2 and the resistor 24. The resistor 24 is configured to limit the output of the inverter 22 so that the resonator 26 is not over driven.

When the first switch SW1 is in on state, the output terminal TO of the oscillating unit 20 and the one end of the resonator 26 are connected to each other. This allows the main-clock oscillating at the clock frequency corresponding to, for example, the resonant frequency of the resonant circuit, to be output from the oscillating unit 20.

When the first switch SW1 is in off state, the output terminal TO of the oscillating unit 20 and the one end of the resonator 26 have no electrical-connection to each other. This allows no main-clock to be outputted from the oscillating unit 20. In the off state of the first switch SW1, the one end of the first switch SW1 is electrically connected to a power supply line PL. The power supply line PL is electrically connected to a power supply pin PP of the microcomputer 2. To the power supply line PL, an operating voltage Vo is applied via the power supply pin PP from the power supply circuit 3.

The on-chip oscillator 30 is composed of a well-known CR circuit consisting of an amplifier, at least one capacitor, and at least one resistor (not shown); these at least one capacitor and at least one resistor constitute a filter serving as a feedback circuit of the amplifier. The on-chip oscillator 30 works to output the sub-clock.

The ECU 1 is equipped with a second switch SW2. The second switch SW2 is configured to selectively connect one of an output terminal of the on-chip oscillator 30 and the output signal line L1 of the oscillating unit 20 to the CPU 40.

Specifically, when the second switch SW2 selects the output signal line L1 of the oscillating unit 20 to connect it to the CPU 40, the main-clock is supplied to the CPU 40 so that the CPU 40 operates on the main-clock as its operation clock.

In contrast, when the second switch SW2 selects the output terminal of the on-chip oscillator 30 to connect it to the CPU 40, the sub-clock is supplied to the CPU 40 so that the CPU 40 operates on the sub-clock as its operation clock.

Note that a state of the second switch SW2 in which the output signal line L1 of the oscillating unit 20 is selected to be connected to the CPU 40 will be referred to as "on state" hereinafter. In contrast, another state of the second switch SW2 in which the output terminal of the on-chip oscillator 30 is selected to be connected to the CPU 40 will be referred to as "off state" hereinafter.

The power supply circuit 3 is composed of a power supply unit 80, a monitoring unit (MONITOR) 82, and a reset-signal output unit 84.

The power supply unit 80 is electrically connected to a battery 4 serving as an external power source and installed in the vehicle. The battery 4 works to continuously apply a battery voltage VB of, for example, 12 V to in-vehicle components installed in the vehicle. Specifically, the ECU 1 has a power supply terminal PT to which an output terminal of the battery 4 is connected. The power supply unit 80 is electrically connected to the power supply terminal PT of the ECU 1.

When the battery voltage VB is applied from the battery 4 to the ECU 1 via the power supply terminal PT, the power supply unit 80 works to receive the battery voltage VB applied from the battery 4. The power supply unit 80 works to step down the received battery voltage VB to the operating voltage Vo of, for example, 5 V on which the microcomputer 2 operates.

The monitoring unit 82 is operatively connected to the reset-signal output unit 84. The monitoring unit 82 consists of, for example, a watchdog timer. The monitoring unit 82 is electrically connected to the WDC output unit 48 via at least one watchdog pin WT of the microcomputer 2.

The monitoring unit 82 is operative to monitor the WDC signal output from the WDC output unit 48 of the microcomputer 2 and to output an abnormal signal with a high level when any abnormalities occur; this abnormal signal represents the occurrence of any abnormalities.

For example, the watchdog timer is operative to count down from an initial value to zero and to be periodically reset every time the WDC signal is input to the watchdog timer. If the count value of the watchdog timer ever reaches zero before the watchdog timer is reset, the microcomputer 2 is presumed to be malfunctioning, such as a program being executed by the microcomputer 2 hangs up or freezes, so the watchdog timer outputs the abnormal signal to the reset-signal output unit 84.

When energized, the reset-signal output unit 84 works to continuously output a reset signal with an inactive level, such as a high level (low active) to the reset pin 10.

Upon receipt of the abnormal signal output from the monitoring unit 82, the reset-signal output unit 84 works to turn the reset signal from the high level (inactive level) to a low level (active level) for a given length of time. The active level of the reset signal being sent to the microcomputer 2 via the reset pin 10 instructs the microcomputer 2 to be reset.

In the first embodiment, as illustrated in FIG. 1, the reset-signal output unit 84 is electrically connected via an ignition switch terminal IT to an ignition switch (IGSW) 5 installed in the vehicle. For example, the ignition switch 5 is configured to be turned on by, for example, the location of an ignition key of the vehicle being inserted in a key cylinder thereof to the ignition position from the off position by the vehicle's driver.

Specifically, the reset-signal output unit 84 is operative to determine whether the microcomputer 2 requires control of the target in-vehicle devices depending on the on/off state of the ignition switch 5. The reset-signal output unit 84 is operative to change the output level of the reset signal based on the determination result.

When the ignition switch 5 is turned on, the reset-signal output unit 84 determines that the microcomputer 2 requires control of the target in-vehicle devices to thereby change the reset signal from the active level (low level) to the inactive level (high level).

In contrast, when the ignition switch 5 is turned off, the reset-signal output unit 84 determines that the microcomputer 2 does not require control of the target in-vehicle devices to thereby change the reset signal from the inactive level (high level) to the active level (low level).

For example, when the ignition switch 5 is in on state, an ignition signal with an active level, such as a high level in high active, is sent from the ignition switch 5 to the reset-signal output unit 84, which allows the reset signal output unit 84 to determine that the ignition switch 5 to be in on state.

On the other hand, when the ignition switch 5 is in off state, the ignition signal with an inactive level, such as a low level in high active, is sent from the ignition switch 5 to the reset-signal output unit 84. This allows the reset signal output unit 84 to determine that the ignition switch 5 to be in off state.

During the reset signal being in the active level (low level), the CPU 40 of the microcomputer 2 is in shutdown mode.

The reset signal with low active output from the reset-signal output unit 84 is supplied, as an OFF instruction signal, to both the first and second switches SW1 and SW2. When the output level of the reset signal is turned from the inactive level (high level) to the active level (low level), the OFF instruction signal is turned from the inactive level (high level) to the active level (low level). The OFF instruction signal with the active level (low level) allows the first and second switches SW1 and SW2 to be turned off.

In addition, the CPU 40 is programmed to output an ON instruction signal with high active to both the first and second switches SW1 and SW2. When the output level of the ON instruction signal is turned from the inactive level (low level) to the active level (high level), the ON instruction signal with the active level (high level) allows the first and second switches SW1 and SW2 to be turned on.

Next, operations of the ECU 1 will be described hereinafter with reference to FIG. 2.

Figure 2:
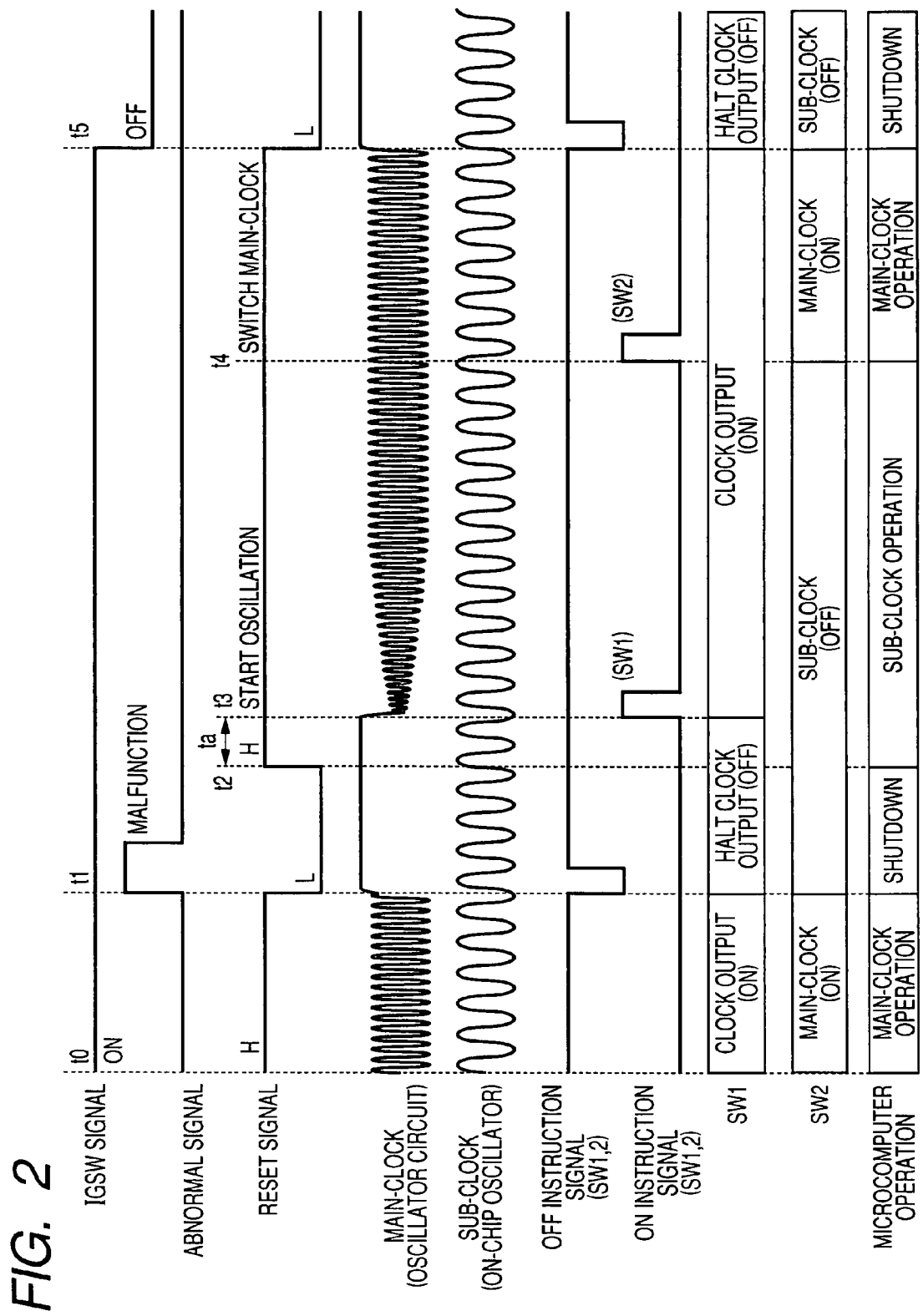
FIG. 2 is a timing chart schematically illustrating on/off timings of various signals passed among components of the electronic control unit illustrated in FIG. 1.

In top of FIG. 2, an example of the timing chart of the IGSW signal is illustrated, and, in second from the top in FIG. 2, an example of the timing chart of the abnormal signal output from the monitoring unit 82 is illustrated. In third from the top in FIG. 2, an example of the timing chard of the reset signal output from the reset-signal output unit 84 is illustrated, and, in fourth from the top in FIG. 2, an example of the timing chart of the main-clock is illustrated.

In fifth from the top in FIG. 2, an example of the timing chart of the sub-clock is illustrated, and, in sixth from the top in FIG. 2, an example of the timing chart of the OFF instruction signal is illustrated. In seventh from the top in FIG. 2, an example of the timing chart of the ON instruction signal is illustrated, and, in eighth from the top in FIG. 2, an example of the timing chart of the on and off timings of the first switch SW1 is illustrated.

In ninth from the top in FIG. 2, an example of the timing chart of the on and off timings of the second switch SW2 is illustrated, and, in tenth from the top in FIG. 2, an example of the timing chart of the operational state of the microcomputer 2 is illustrated.

Referring to FIG. 2, at time t0, the ignition switch 5 is in on state, and there are no malfunctions in the microcomputer 2. In this condition, the reset signal is in inactive level (high level illustrated by "H" in FIG. 2), and the first switch SW1 is in on state so that the oscillator circuit 28 operates to output the main-clock, and the second switch SW2 is in on state so that the main-clock is supplied to both the CPU 40 and the first counter 50.

This allows the CPU 40 (the microcomputer 2) to operate on the main-clock. The CPU 40 running on the main-clock carries out normal tasks to control the corresponding target in-vehicle devices in accordance with at least one of the programs P stored in the ROM 42.

Next, at time t1, if a failure occurs in the microcomputer 2, the WDC signal is not periodically output from the WDC output unit 48 of the microcomputer 2. This causes the monitoring unit 82 of the power supply circuit 3 to output the abnormal signal indicative of the occurrence of any failures to the reset-signal output unit 84. The reset-signal output unit 84 changes the reset signal from the inactive level (high level) to the active level (low level, illustrated by "L" in FIG. 2) for a given length of time.

The reset signal with the active level (low level) causes the CPU 40 to be shut down. In addition, when the output level of the reset signal is turned from the inactive level (high level) to the active level (low level), the OFF instruction signal with the active level is supplied to both the first and second switches SW1 and SW2. This allows the first and second switches SW1 and SW2 to be turned off.

The off state of the first switch SW1 causes the oscillator circuit 28 to halt outputting of the main-clock. The off state of the second switch SW2 causes the on-chip oscillator 30 and the CPU 40 to be electrically connected with each other.

After the given length of time has elapsed, at time t2, the reset-signal output unit 84 changes the reset signal from the active level (low level) to the inactive level (high level). The reset signal with the inactive level (high level) causes the CPU 40 to restart from its initial state.

After restart, because the on-chip oscillator 30 and the CPU 40 are electrically coupled to each other, the CPU 40 operates on the sub-clock supplied from the on-chip oscillator 30.

After a period ta has elapsed since time t2, at time t3, the CPU 40 causes the oscillator circuit 28 to start operations for main-clock output.

Specifically, the CPU 40 outputs the ON instruction signal with the active level (high level) to the first switch SW1 to thereby turn on the first switch SW1. The on state of the first switch SW1 allows the oscillator circuit 28 to output the main-clock.

Note that the timing when the oscillator circuit 28 starts to output the main-clock, in other words, the period ta from the restart of the CPU 40 at time t2 to the start of the oscillator circuit 28 at time t3 shows a length of time required for the CPU 40 to initialize the oscillator circuit 28. Specifically, the CPU 40 is programmed to start to initialize the oscillator circuit 28 at time t2, and after the initialization at time t3, programmed to cause the oscillator circuit 28 to start operations for main-clock output.

At the restart timing t2, the CPU 40 can cause the oscillator circuit 28 to start output of the main-clock.

After a given period has elapsed since time t3, because the oscillator circuit 28 is determined to be brought into a stable condition in operation as described hereinafter, the CPU 40 outputs, at time t4, the ON instruction signal with the active level (high level) to the second switch SW2 to turn it on. The on state of the second switch SW2 shifts the state in which the CPU 40 and the on-chip oscillator 30 are electrically coupled to each other to a state in which the CPU 40 and the oscillator circuit 28 are electrically coupled to each other.

Thereafter, at time t5, when the ignition switch 5 is turned off, the reset-signal output unit 84 determines that the microcomputer 2 does not require control of the target in-vehicle devices to thereby change the reset signal from the inactive level (high level) to the active level (low level). This allows the CPU 40 to be shut down. The reset signal with the active level (low level) also causes the first and second switches SW1 and SW2 to be turned off.

Next, an example of the specific structure of the reset-signal output unit 84 capable of implementing the operations thereof will be described hereinafter with reference to FIG. 3.

Figure 3:
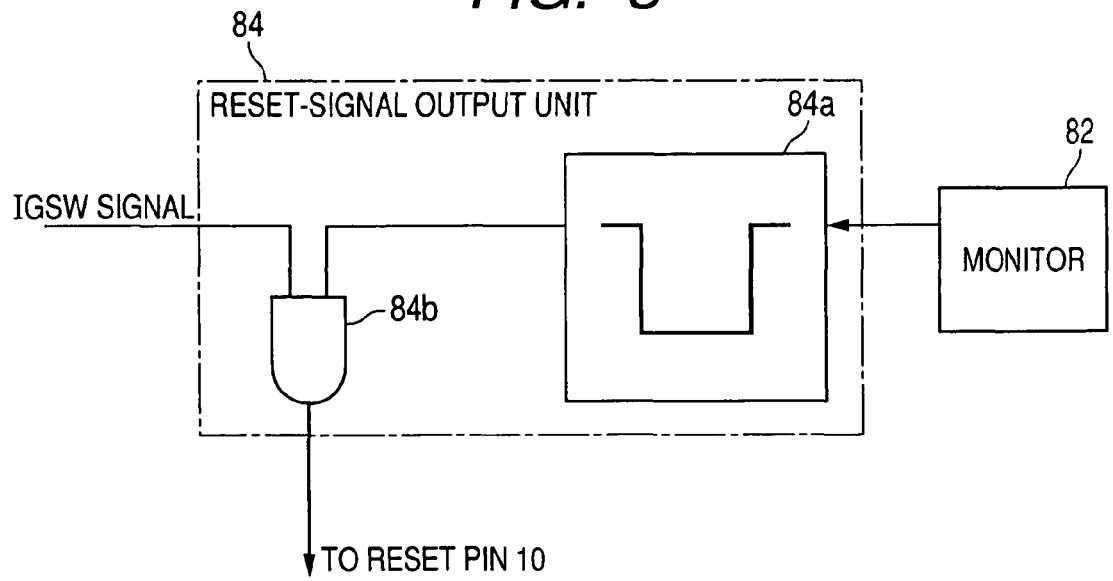
FIG. 3 is a circuit diagram schematically illustrating an example of the structure of a reset-signal output unit illustrated in FIG. 1.

FIG. 3 schematically illustrates an example of the specific structure of the reset-signal output unit 84.

Referring to FIG. 3, the reset-signal output unit 84 is composed of a one-shot pulse generator 84*a* and an AND circuit 84*b*. The one-shot pulse generator 84*a* is electrically connected to the monitoring unit 82 and to one input terminal of the AND circuit 84*b*, and operative to generate one pulse having the low level and a predetermined time interval (pulse width) in response to receiving the abnormal signal with the active level output from the monitoring unit 82. The one-shot pulse generator 84*a* is operative to output the generated one pulse to the AND circuit 84*b*.

The other input terminal of the AND circuit 84*b* is electrically connected via the ignition switch terminal IT to the ignition switch 5, and an output terminal of the AND circuit 84*b* is electrically connected to the reset terminal 10 of the microcomputer 2.

When both the IGSW signal is high (the ignition switch 5 is in on state) and the one pulse input to the AND circuit 84*b* is high (the microcomputer 2 is normally operating), the AND circuit 84*b* works to output, to the microcomputer 2 via the reset pin 10, a signal with the high level representing the reset signal with the inactive level.

In contrast, either the IGSW signal is low (the ignition switch 5 is in off state) or the one pulse input to the AND circuit 84*b* is low (a malfunction occurs in the microcomputer 2), the AND circuit 84*b* works to output, to the microcomputer 2 via the reset pin 10, a signal with the low level representing the reset signal with the low level (active level).

Specifically, even if the one pulse with the high level is output from the one-shot pulse generator 84*a*, when the IGSW signal is low, the AND circuit 84*b* outputs the reset signal with the active level (low level).

Moreover, even if the IGSW signal is high, when the one pulse with the low level is output from the one-shot pulse generator 84*a*, the AND gate 84*b* outputs the reset signal with the active level (low level) for the time interval of the one pulse being input thereto.

Next, a clock switching task to be executable by the CPU 40 in accordance with at least one of the programs P will be described hereinafter with reference to FIG. 4. The clock switching task illustrated in FIG. 4 are required to turn on both the first and second switches SW1 and SW2 every time the reset signal is turned from the low level (active level) to the high level (inactive level).

Note that, as set forth above, when the reset signal is changed from the inactive level to the active level so that the CPU 40 is shut down, the second switch SW2 is turned off. This allows the state in which the CPU 40 and the oscillator circuit 28 are electrically coupled to each other to be shifted to the state in which the CPU 40 and the on-chip oscillator 30 are electrically coupled to each other.

Thereafter, when the reset signal is changed from the active level to the inactive level, the CPU 40 restarts to operate on the sub-clock supplied from the on-chip oscillator 30.

Figure 4:
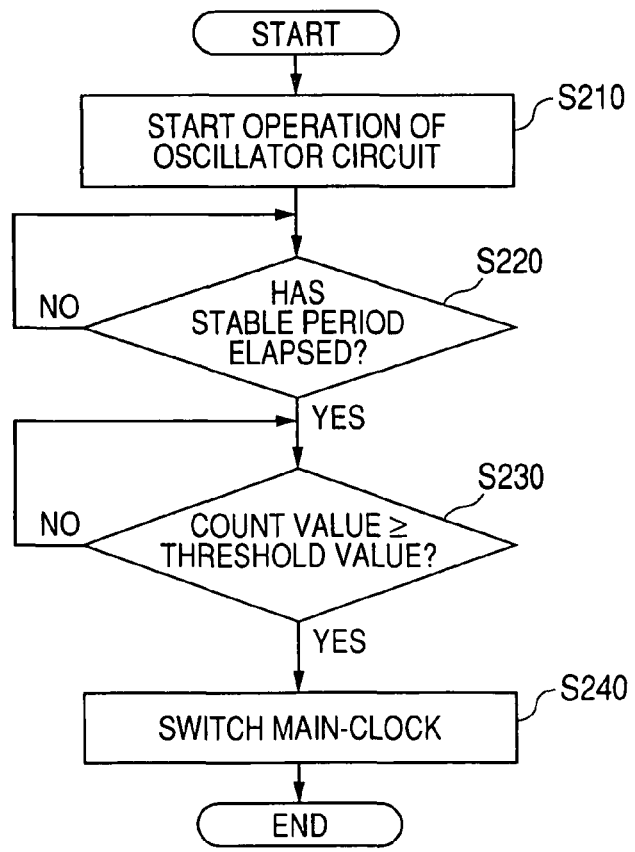
FIG. 4 is a flowchart schematically illustrating a clock-frequency switching task to be executable by a CPU of a microcomputer illustrated in FIG. 1.

Referring to FIG. 4, the CPU 40 causes the oscillator circuit 28 to start operations for main-clock output at a predetermined timing, for example, time t3 in FIG. 2 in step S210. Specifically, in step S210, the CPU 40 outputs the ON instruction signal with the active level (high level) to the first switch SW1 to thereby turn on the first switch SW1. The on state of the first switch SW1 allows the oscillating unit 20 and the resonator 26 to be electrically coupled to each other, which allows the oscillator circuit 28 to start outputting the main-clock.

Next, the CPU 40 measures a period that has elapsed since the start of operations of the oscillator circuit 28 (see time t3) using, for example, a time-measuring function installed therein, and determines whether the measured period reaches a predetermined stable period in step S220.

Note that the stable period is expected to be required for the oscillator circuit 28 to become stable in operation. For example, as parameters for determination of whether the oscillator circuit 28 becomes stable in operation, the amplitude and/or frequency of the main-clock generated by the oscillator circuit 28 can be used.

The stable period has been determined based on the characteristics of the resonator 26 and/or on actual measurement. The previously determined stable period has been stored as data in, for example, the ROM 42 of the microcomputer 2.

Specifically, in step S220, when it is determined that the measured period does not reach the stable period of the data readout from the ROM 42 (the determination in step S22 is NO), the CPU 40 repeats the determination in step S220 while the measured period is varied.

Otherwise, when it is determined that the measured period reaches the stable period of the data readout from the ROM 42 (the determination in step S220 is YES), the CPU 40 proceeds to step S230.

In step S230, the CPU 40 further determines whether the oscillator circuit 28 is stable in operation using another way different from the way used in step S220.

Specifically, in the first embodiment, the first counter 50 is configured to be incremented or decremented by 1 every clock cycle of the main-clock, so the count value of the first counter 50 shows the number of oscillations of the main-clock generated by the oscillator circuit 28.

For this reason, in step S230, the CPU 40 reads out the count value of the first counter 50 to thereby determine whether the readout count value of the first counter 50 is equal to or greater than a predetermined threshold value. Note that, the first counter 50 can be configured to be incremented or decremented by a positive integer every plural cycles of the main-clock, such as two cycles or three cycles of the main-clock. Similarly, the second counter 52 can be configured to be incremented or decremented by a positive integer every plural cycles of the sub-clock, such as two cycles or three cycles of the sub-clock.

In addition, the predetermined threshold value can be determined as follows. Specifically, like the stable time, the number of oscillations of the main-clock generated by the oscillator circuit 28, which is required for the oscillator circuit 28 to become stable in operation, has been calculated based on the characteristics of the resonator 26 and/or determined based on actual measurement. For example, as parameters for determination of whether the oscillator circuit 28 becomes stable in operation, the amplitude and/or frequency of the main-clock generated by the oscillator circuit 28 can be used.

The previously calculated or determined number of oscillations of the main-clock generated by the oscillator circuit 28 has been stored as data in, for example, the ROM 42 of the microcomputer 2.

Specifically, in step S230, the CPU 40 reads out the threshold value from the ROM 42, and reads out the count value of the first counter 50. Then, the CPU 40 determines whether the readout count value of the first counter 50 reaches the readout threshold value in step S230.

When it is determined that the count value of the first counter 50 does not reach the threshold value (the determination in step S230 is NO), the CPU 40 repeats the determination in step S230 while the count value is varied.

Otherwise, when it is determined that the count value of the first counter 50 reaches the threshold value (the determination in step S230 is YES), the CPU 40 determines that the oscillator circuit 28 is stable in operation, proceeding to step S240.

In step S240, the CPU 40 changes the sub-clock generated by the on-chip oscillator 30, on which the CPU itself operates, to the main-clock generated by the oscillator circuit 28.

Specifically, in step S240, the CPU 40 outputs the ON instruction signal with the active level (high level) to the second switch SW2 to thereby turn on the second switch SW2. The on state of the second switch SW2 can shift:

the state in which the CPU 40 and the on-chip oscillator 30 are electrically coupled to each other to that in which the CPU 40 and the oscillator circuit 28 are electrically coupled to each other.

After completion of the shift of the electrical connection among the CPU 40, the oscillator circuit 28, and the on-chip oscillator 30, the CPU 40 exits the clock switching task.

As described above, in the first embodiment, during the reset signal with the active level being input to the reset pin 10, in other words, with the CPU 40 being shut down, it is possible to prevent the oscillator circuit 28 from operating. This allows the CPU 2 to be automatically shifted into low power consumption mode, such as sleep mode, suspend mode, or hibernation mode, making it possible to reduce current drain in the microcomputer 2 and the ECU 1.

Specifically, in the first embodiment, the microcomputer 2 is capable of reducing its current drain without providing one or more dedicated pins (ports) for reduction of the current drain, such as pins to which signals for disabling the oscillator circuit 28. This can prevent the number of pins of the microcomputer 2 from increasing.

In the first embodiment, when the reset signal being shifted from the active level to the inactive level triggers the CPU 40 to start (restart) operations, the CPU 40 is configured to operate on the sub-clock generated by the on-chip oscillator 30. As described above, the amplitude and/or frequency of the sub-clock output from the on-chip oscillator 30 are stable.

Thereafter, when the amplitude and/or frequency of the main-clock output from the oscillator circuit 28 become stable, the CPU 40 is configured to switch the sub-clock, on which it operates, to the main-clock output from the oscillator circuit 28.

This allows any events generated by executing various programs P stored in the ROM 42 to be synchronized with the clock frequency of the main-clock, making it possible to execute control of the corresponding target in-vehicle devices without trouble due to the timings of the events.

Next, a first modification of the first embodiment will be described hereinafter.

Figure 5:
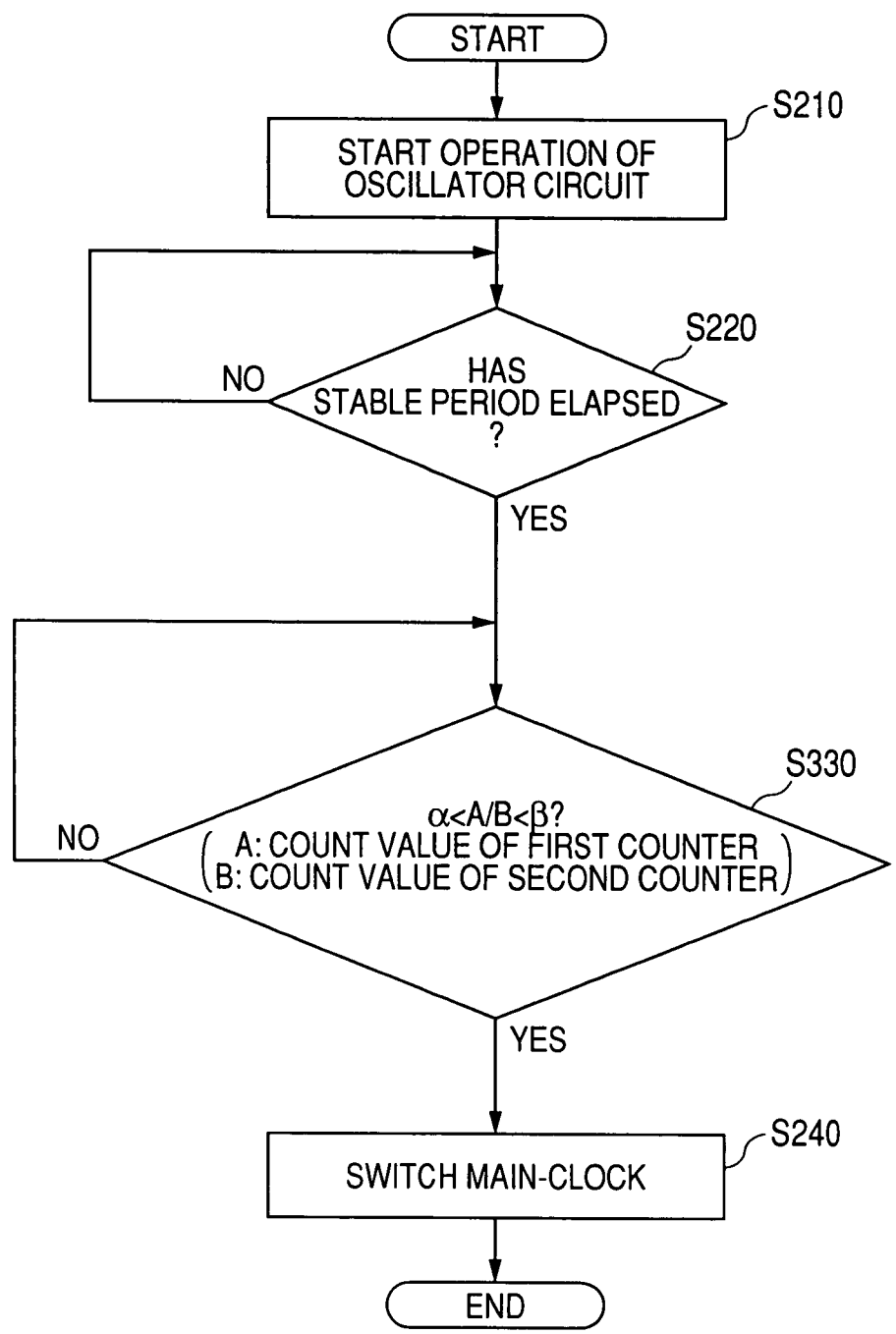
FIG. 5 is a flowchart schematically illustrating a clock-frequency switching task to be executable by the CPU illustrated in FIG. 1 according to a first modification of the first embodiment.

In the first modification, the CPU 40 is programmed to carry out a clock switching task illustrated in FIG. 5 in place of that in FIG. 4. Other structures and operations of the first modification are substantially identical to those of the first embodiment, and therefore descriptions of them are omitted.

Referring to FIG. 5, the clock switching task according to the first modification has a different point against the clock switching task illustrated in FIG. 4 in which the CPU 40 executes operations in step S330 in place of those in step S230. Accordingly, the operations in step S330 will be described hereinafter in detail, and descriptions of other operations of the clock switching task according to the first modification are omitted.

Like the first embodiment, the first counter 50 is configured to be incremented or decremented by 1 every clock cycle of the main-clock, so the count value of the first counter 50 shows the number of oscillations of the main-clock generated by the oscillator circuit 28. Similarly, the second counter 52 is configured to be incremented or decremented by 1 every clock cycle of the sub-clock.

In the first modification, the clock frequency of the main-clock is set to be a first frequency f1 (Hz), and the clock frequency of the sub-clock is set to be a second frequency f2 (Hz) lower than the first frequency f1.

Like the first embodiment, the on-chip oscillator 30 is configured to continuously execute the sub-clock output operations even if the oscillator circuit 28 does not execute operations, and therefore, operations of the on-chip oscillator 30 are stable. This allows the second frequency f2 of the sub-clock output from the on-chip oscillator 30 to be substantially kept constant.

Under the feature of the substantially constant second frequency f2, the CPU 40 determines whether the oscillator circuit 28 is stable in operation relative to the second frequency f2 in step S330. In other words, the CPU 40 determines whether the oscillator circuit 28 stably outputs the main-clock approximately with the first frequency f1 relative to the frequency f2 in step S330.

Specifically, if the oscillator circuit 28 is stable in operation, the ratio of the first frequency f1 to the second frequency f2 should become constant over a period of time. In other words, if the oscillator circuit 28 is stable in operation, the ratio of the count value of the first counter 50 to that of the second counter 52 should become constant over a period of time. The ratio of the count value of the first counter 50 to that of the second counter 52 will be referred to as "count ratio" hereinafter.

When the count ratio lies within a predetermined allowable range, the CPU 40 determines that the oscillator circuit 28 is stable in operation.

For example, when the first frequency f1 is set to be 1 MHz, and the second frequency f2 is set to be 10 KHz, in other words, the first frequency f1 is given by "f1=100×f2", the CPU 40 executes the determination as follows:

Assuming that the count value of the first counter 50 is a count value A, and the count value of the second counter 52 is a count value B, in step S330, the CPU 40 establishes, as an allowable range for the count ratio A/B, the following equation:

$$\alpha(=90) < A/B < \beta(=110) \qquad \text{[Equation 1]}$$

Then, the CPU 40 determines whether the count ratio A/B meets the equation 1 in step S330.

Note that constant values $\alpha$ (=90) and $\beta$ (=110) representing the lower and upper limits of the allowable range have been determined based on the count ratio and stored in, for example, ROM 42.

When it is determined that the count ratio A/B does not meet the established allowable range corresponding to the established equation 1 (the determination in step S330 is NO), the CPU 40 repeats the determination in step S330 while the count values A and B are varied.

Otherwise when it is determined that the count ration A/B meets the established allowable range corresponding to the established equation 1 (the determination in step S330 is YES), the CPU 40 determines that the oscillator circuit 28 is stable in operation, proceeding to step S240 (see FIG. 4).

As described above, in the first modification, when the reset signal being shifted from the active level to the inactive level triggers the CPU 40 to restart operations, the CPU 40 is configured to operate on the sub-clock generated by the on-chip oscillator 30.

Thereafter, when the amplitude and/or frequency of the main-clock output from the oscillator circuit 28 become stable (see steps S220 and S330 in FIG. 5), the CPU 40 is configured to switch the sub-clock, on which it operates, to the main-clock output from the oscillator circuit 28.

This allows any events generated by executing various programs P stored in the ROM 42 to be synchronized with the clock frequency of the main-clock, making it possible to execute control of the corresponding target in-vehicle devices without trouble due to the timings of the events.

For example, the oscillator circuit 28 may become unstable in operation so that the clock frequency of the main-clock output from the oscillator circuit 28 becomes higher than the previously set first frequency f1. In the event of the oscillator's operation becoming unstable, the number of oscillations based on the real clock frequency of the main-clock is greater than that of oscillations based on the previously set first frequency f1.

In this case, when performing the clock switching task illustrated in FIG. 4, it may be erroneously determined that the count value of the first counter 50 reaches the threshold value before the oscillator circuit 28 becomes stable in operation.

In the first modification, if the oscillator circuit 28 is stable in operation, the count ratio of the count value of the first counter 50 to that of the second counter 52 should become constant over a period of time.

For this reason, in the first modification, the CPU 40 is programmed to use the allowable range established based on the target count ratio and to determine whether the count ratio A/B meets the equation 1 in order to determine whether the oscillating circuit 28 is stable in operation.

This can prevent, even if the oscillator circuit 28 become unstable so that the number of oscillations based on the real clock frequency of the main-clock is greater than that of oscillations based on the previously set first frequency f1, the oscillator circuit 28 from being erroneously determined to become stable.

In a second modification of the first embodiment, the CPU 40 can be programmed to perform the operations in step S330 after the operations in step S230 and before the operations in step S240 (see FIG. 4). In a third modification of the first embodiment, the CPU 40 can be programmed to perform the operations in step S330 after the operations in step S220 and before the operations in step S230 (see FIG. 4).

In the first embodiment and the first to third modifications, when the reset signal is turned to the active level, the OFF instruction signal with the active level to be supplied to the first and second switches SW1 and SW2 via the reset pin 10 disables the operations of the oscillator circuit 28. In other words, the hard-wired structure composed of the reset pin 10 turns off the first and second switches SW1 and SW2 to thereby control the halt of operations of the oscillator circuit 28.

In contrast, in the first embodiment and the first to third modifications, when the reset signal is turned to the inactive level, the CPU 40 is programmed to turn on the first and second switches SW1 and SW2 to thereby control the start of operations of the oscillator circuit 28 (see step S210 in FIG. 4). In other words, a software structure composed of the CPU 40 turns on the first and second switches SW1 and SW2 to thereby control the start of operations of the oscillator circuit 28.

For example, when the reset signal is turned to the inactive level, the hard-wired structure composed of the reset pin 10 can output the ON instruction signal to the first and second switches SW1 and SW2 to turn on them, thereby controlling the start of operations of the oscillator circuit 28.

However, as compared with a case where the hard-wired structure is configured to control the start of operations of the oscillator circuit 28, the software structure composed of the CPU 40 has an advantage of being able to reduce current drain in the microcomputer 2 and the ECU 1.

Figure 6:
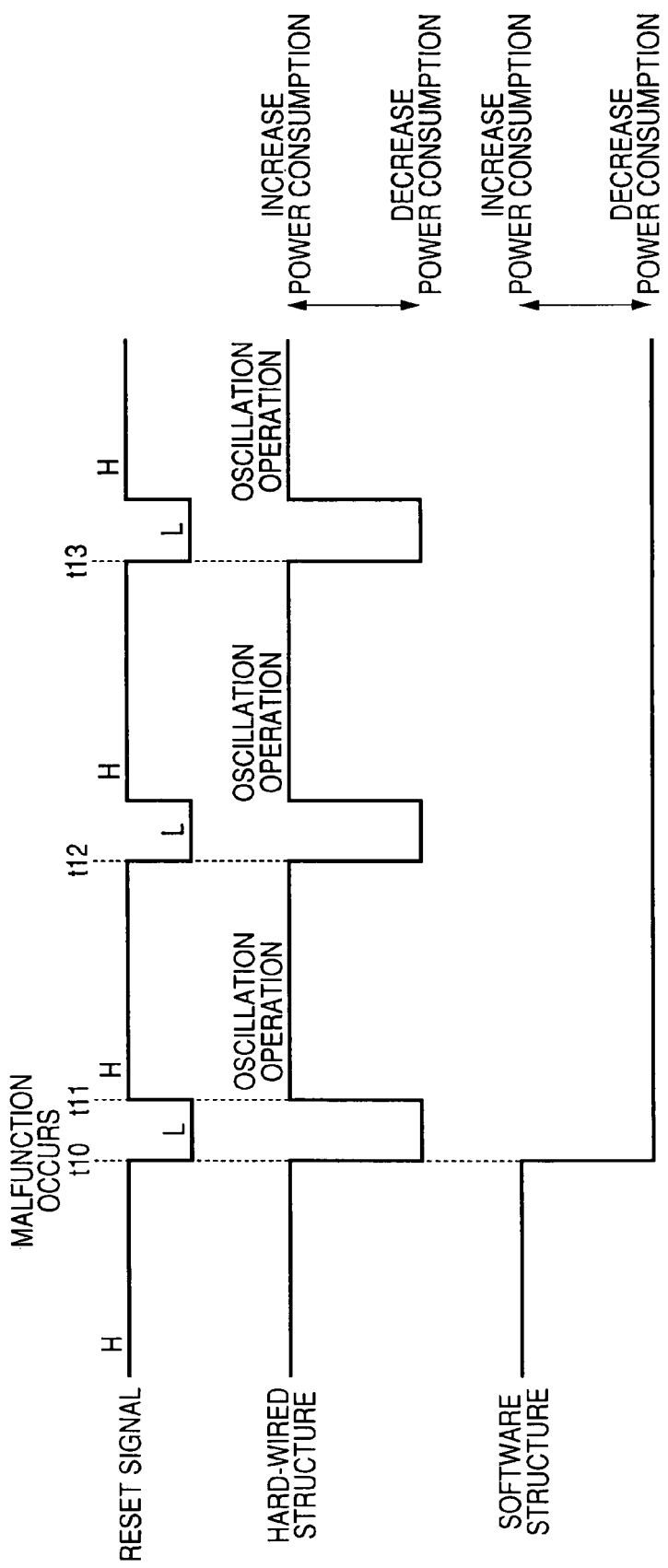
FIG. 6 is a timing chart schematically illustrating operations of a hard-wired structure for controlling the start of operations of an oscillator circuit illustrated in FIG. 1 and operations of a software structure for controlling the start of operations of the oscillator circuit according to the first embodiment and its modifications.

In FIG. 6, (a) schematically illustrates current drain in the ECU 1 when the hard-wired structure is configured to control the start of operations of the oscillator circuit 28. In contrast, (b) schematically illustrates current drain in the ECU 1 when the software structure is configured to control the start of operations of the oscillator circuit 28.

Referring to FIG. 6, it is assumed that a malfunction occurs in the microcomputer 2 at time t10, and that reset of the microcomputer 2 cannot return the microcomputer 2 to its normal state because the malfunction remains therein.

In this assumption, when a malfunction occurs in the microcomputer 2 at time t10, the reset signal is turned to the active level (low level). This causes the microcomputer 2 to be reset at time t10.

Thereafter, when the reset signal is turned to the inactive level (high level) at time t11, in the hard-wired structure, the oscillator circuit 28 starts to operations so that the microcomputer 2 operates on the main-clock supplied from the oscillator circuit 28. This causes current drain in the microcomputer 2 and the ECU 1 to increase.

Because the malfunction remains in the microcomputer 2, at time t12 after a given time has elapsed since time t11, detection of the malfunction in the microcomputer 2 by the monitoring unit 82 allows the reset signal to be turned to the active level (low level) again. This causes the microcomputer 2 to be repeatedly reset at time t12. The same microcomputer reset operations are repeated at time t13.

In contrast, when the reset signal is turned to the inactive level (high level) at time t11, in the software structure, the microcomputer 28 starts to operates on the sub-clock supplied from the on-chip oscillator 30.

In this case, because the malfunction has occurred in the microcomputer 2, the ON instruction signal with the active level (high level) cannot be output from the microcomputer 2 to the first switch SW1. In other words, it is unlikely that the ON instruction signal with the active level will be necessarily output from the microcomputer 2 to the first switch SW1. Note that the default level of the ON instruction signal to be output from the microcomputer 2 is set to the inactive level (low level).

When the ON instruction signal with the active level cannot be output from the microcomputer 2, the first switch SW1 is kept in off state. This allows the oscillator circuit 28 not to start operations for main-clock output, which increases the possibility of being able to reduce current drain in the microcomputer 2 and the ECU 1.

As described above, as compared with the hard-wired structure configured to turn on the first switch SW1, the software structure allows the first switch SW1 to be likely kept in off state, making it possible to reduce current drain in the microcomputer 2 and the ECU 1.

Second Embodiment

A second embodiment of the present invention will be described hereinafter with reference to FIGS. 7 to 9.

In the second embodiment, the present invention is applied to an ECU 1A installed in a vehicle for controlling target in-vehicle devices, such as an engine and/or an electronic throttle of the engine.

Figure 7:
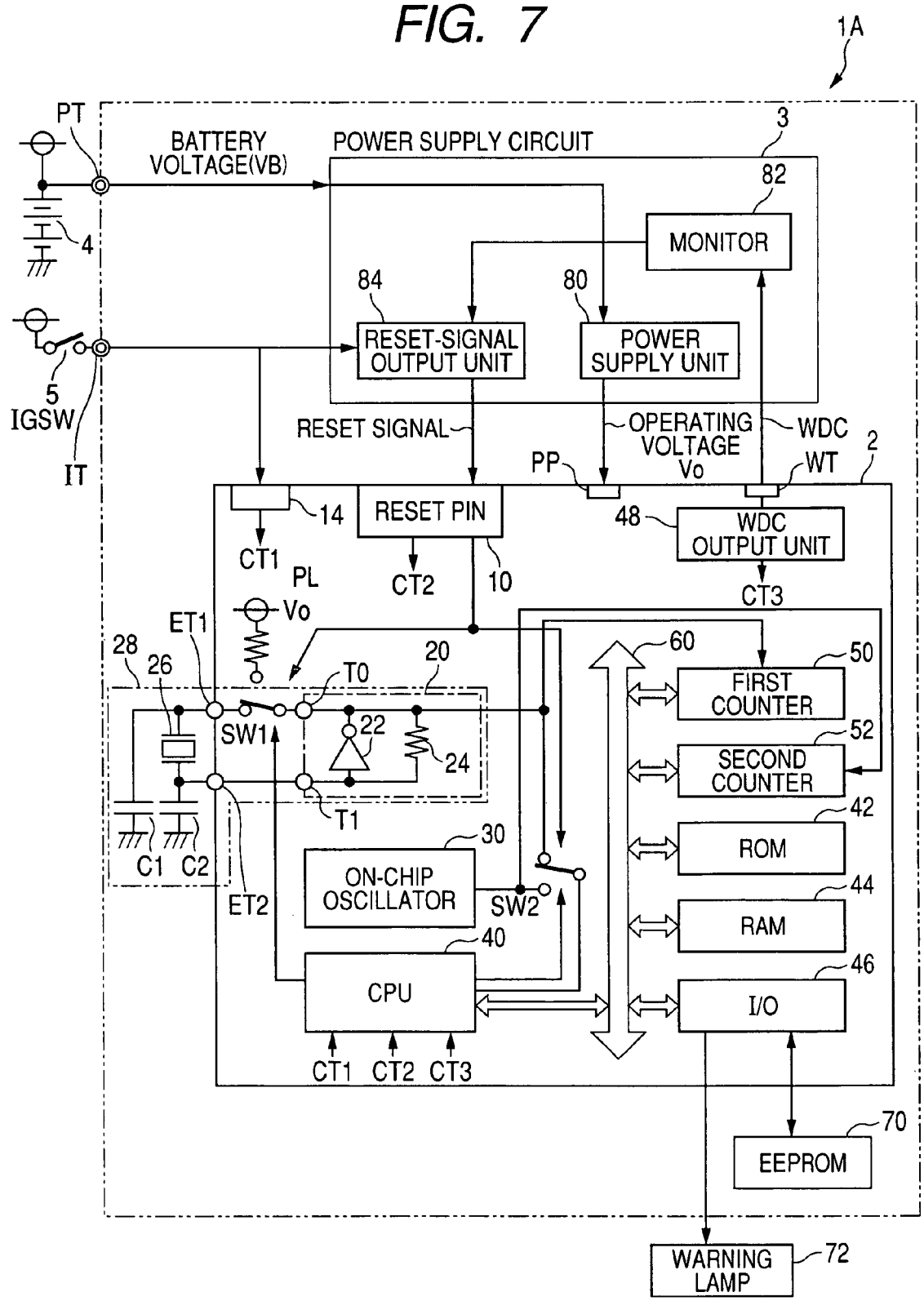
FIG. 7 is a block diagram schematically illustrating an example of the configuration of an electronic control unit according to a second embodiment of the present invention.

Referring to FIG. 7, the ECU 1A has some different points in structure against the ECU 1 illustrated in FIG. 1.

Specifically, in the ECU 1A, the ignition switch terminal IT is electrically connected to both the reset-signal output unit 84 and at least one of the I/O ports 14.

The ECU 1A includes an EEPROM 70 as an example of nonvolatile memories. The EEPROM 70 is electrically connected to the I/O interface 46 and operative to store therein information.

Warning lamps 72 have been installed in the vehicle at the exterior of the ECU 1. The warning lamps 72 are operative to give warnings of the occurrence of malfunctions in the ECU 1.

In the second embodiment, the reset-signal output unit 84 has, for example, the circuit structure illustrated in FIG. 3 and works to execute operations set forth above based on the circuit structure in FIG. 3.

Like the first embodiment, the CPU 40 is programmed to execute the clock switching task illustrated in FIG. 4 or that illustrated in FIG. 5.

The ECU 1A is configured to allow current drain therein to decrease even if a failure occurs in the reset-signal output unit 84 so that the operations based on the circuit structure in FIG. 3 cannot be executed.

Next, operations of the ECU 1A will be described hereinafter with reference to FIG. 8.

The timing charts respectively illustrated in the top and second to tenth are identical to those respectively illustrated therein.

Figure 8:
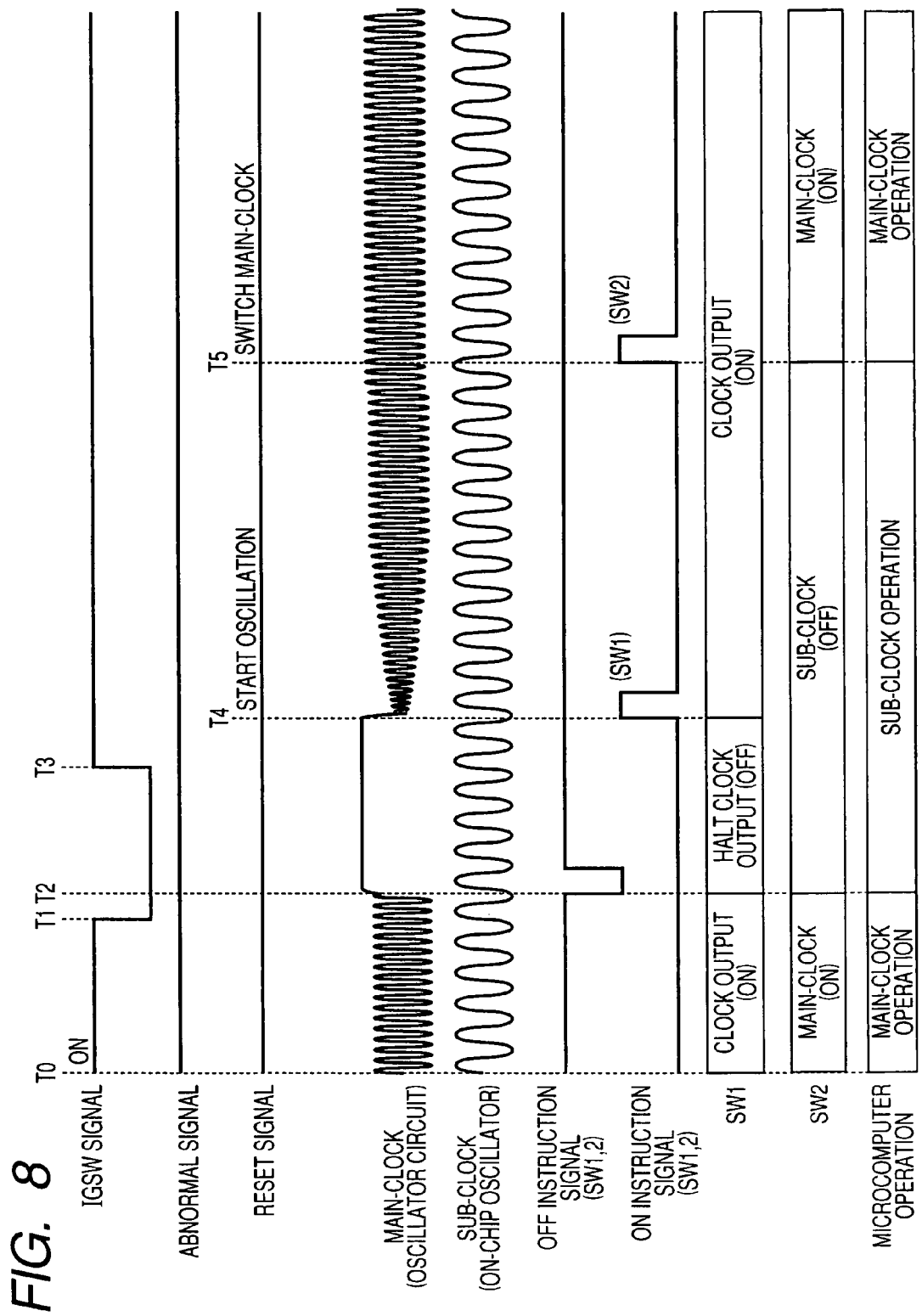
FIG. 8 is a timing chart schematically illustrating on/off timings of various signals passed among components of the electronic control unit illustrated in FIG. 7.

Referring to FIG. 8, at time T0, the ignition switch 5 is in on state, and there are no malfunctions in the microcomputer 2. In this condition, the reset signal is in inactive level (high level illustrated by "H" in FIG. 8), and the first switch SW1 is in on state so that the oscillator circuit 28 operates to output the main-clock, and the second switch SW2 is in on state so that the main-clock is supplied to both the CPU 40 and the first counter 50.

This allows the CPU 40 (the microcomputer 2) to operate on the main-clock. The CPU 40 running on the main-clock carries out normal tasks to control the corresponding target in-vehicle devices in accordance with at least one of the programs P stored in the ROM 42.

Next, at time T1, the ignition switch IGSW is turned off. At time T1, if a failure occurs in the reset-signal output unit 84, the reset signal is kept in the inactive level (high level) so that the reset signal with the active level (low level) cannot be output from the reset-signal output unit 84 (see third from the top in FIG. 8).

In the event of a failure occurring in the reset-signal output unit 84, in the ECU 1A according to the second embodiment, the CPU 40 is programmed to output the OFF instruction signal with the active level to each of the first and second switches SW1 and SW2 at time T2.

Specifically, the CPU 40 detects the IGSW signal input via at least one of the I/O ports 14 and the I/O interface 46 thereto to thereby determine that the ignition switch 5 is turned off because the IGSW signal has the low level during the ignition switch 5 being in off state.

After the determination, because the CPU 40 cannot receive the reset signal with the inactive level due to the occurrence of malfunction in the reset-signal output unit 84, the CPU 40 outputs the OFF instruction signal with the active level (low level) to the second switch SW2. The OFF instruction signal with the active level allows the second switch SW2 to be turned off. The off state of the second switch SW2 allows the state in which the CPU 40 and the oscillator circuit 28 are electrically coupled to each other to be shifted to the state in which the CPU 40 and the on-chip oscillator 30 are electrically coupled to each other.

Thereafter, the CPU 40 outputs the OFF instruction signal to the first switch SW1, causing the first switch SW1 to be turned off. The off state of the first switch SW1 halts the operations of the oscillator circuit 28, which makes it possible to reduce current drain in the microcomputer 2 and the ECU 1. In other words, when the first switch SW1 is turned off, the microcomputer 2 is shifted from normal operation mode with a normal current drain to low power consumption mode, such as sleep mode, suspend mode, or hibernation mode, with a current drain lower than the normal current drain.

Thereafter, when the ignition switch 5 is turned on at time T3, the CPU 40 detects the IGSW signal input via at least one of the I/O ports 14 and the I/O interface 46 thereto to thereby determine that the ignition switch 5 is turned on because the IGSW signal has the high level during the ignition switch 5 being in on state.

Then, the CPU 40 executes the clock switching task illustrated in FIG. 4 or that illustrated in FIG. 5.

For example, at time T4, the CPU 40 outputs the ON instruction signal with the active level (high level) to the first switch SW1 to thereby turn on the first switch SW1 (see step S210 in FIG. 4 or FIG. 5). The on state of the first switch SW1 allows the oscillating unit 20 and the resonator 26 to be electrically coupled to each other, which allows the oscillator circuit 28 to start outputting the main-clock.

In addition, for example, at time T5, the CPU 40 outputs the ON instruction signal with the active level (high level) to the second switch SW2 to thereby turn on the second switch SW2. The on state of the second switch SW2 can shift:

the state in which the CPU 40 and the on-chip oscillator 30 are electrically coupled to each other to that in which the CPU 40 and the oscillator circuit 28 are electrically coupled to each other. This allows the CPU 40 to operate on the main-clock output from the oscillator circuit 28.

Next, a malfunction detection and low power consumption mode shifting task, referred to simply as "malfunction detection task" to be executable by the CPU 40 in accordance with at least one of the programs P will be described hereinafter with reference to FIG. 9.

Figure 9:
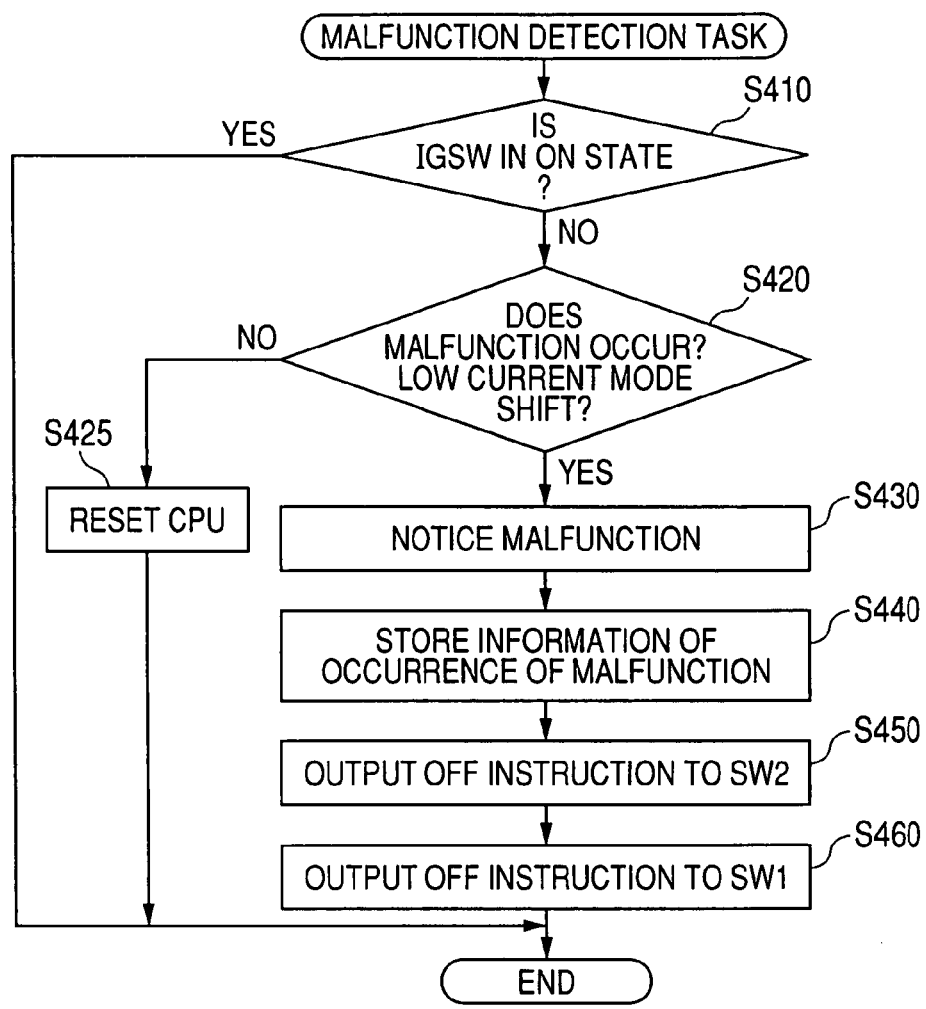
FIG. 9 is a flowchart schematically illustrating a malfunction detection task to be executable by a CPU of a microcomputer illustrated in FIG. 7.

The malfunction detection task illustrated in FIG. 9 is required to detect a malfunction that will occur in the reset-signal output unit 84; this malfunction causes the reset-signal output unit 84 not to output the reset signal with the active level. The malfunction detection task illustrated in FIG. 9 is also required to shift the microcomputer 2 from normal operation mode into low power consumption mode. The malfunction detection task is periodically carried out during the CPU 40 operating on the main-clock.

After starting the malfunction detection task, the CPU 40 determines whether the ignition switch 5 is in on state based on the level of the IGSW signal being input thereto via at least one of the I/O ports 14 and the I/O interface 46 in step S410.

When it is determined that the ignition switch 5 is in on state (the determination in step S410 is YES), the CPU 40 exits the malfunction detection task.

Otherwise, when it is determined that the ignition switch 5 is in off state (the determination in step S410 is NO), the CPU 40 proceeds to step S420.

In step S420, the CPU 40 determines whether a malfunction occurs in the reset-signal output unit 84.

When the reset signal with the active level (low level) is not input to the CPU 40 via the reset pin 10, the CPU 40 determines that a malfunction occurs in the reset-signal output unit 84 to thereby determine that the microcomputer 2 needs shift into the low power consumption mode (the determination in step S420 is YES).

In contrast, when the reset signal with the active level (low level) is input to the CPU 40 via the reset pin 10, the reset signal with the active level allows the CPU 40 to be reset (the determination in step S420 is NO).

After the affirmative determination in step S420, the CPU 40 proceeds to step S430. In step S430, the CPU 40 performs malfunction notification operations to provide notification indicative of the occurrence of a malfunction occurred in the reset-signal output unit 84. For example, in step S430, the CPU 40 controls, via the I/O interface 46, at least one of the warning lamps 72 to turn it on.

Next, the CPU 40 stores, in the EEPROM 70, information representing that a malfunction has occurred in the reset-signal output unit 84 in step S440.

Subsequently, the CPU 40 outputs the OFF instruction signal with the active level (low level) to the second switch SW2. The OFF instruction signal with the active level allows the second switch SW2 to be turned off.

Thereafter, the CPU 40 proceeds to step S460 and outputs the OFF instruction signal to the first switch SW1. This causes the first switch SW1 to be turned off. The off state of the first switch SW1 halts the operations of the oscillator circuit 28, which allows the microcomputer 2 to be shifted from normal operation mode to low power consumption mode with low current drain. Thereafter, the CPU 40 exits the malfunction detection task.

Figure 10:
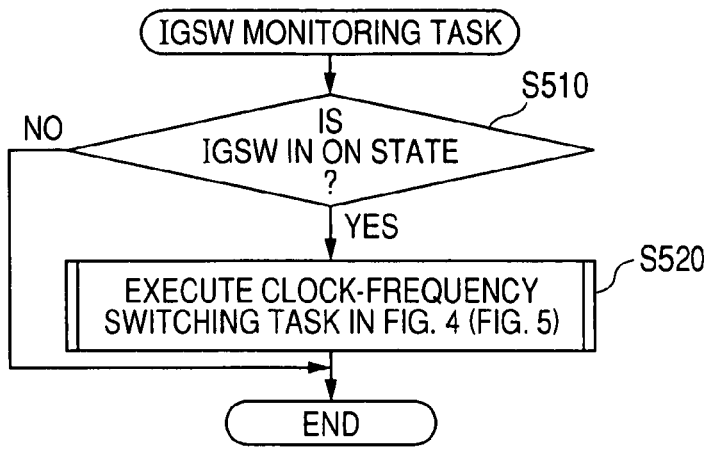
FIG. 10 is a flowchart schematically illustrating an IGSW monitoring task to be executable by the CPU illustrated in FIG. 7 according to the second embodiment.

Next, FIG. 10 schematically illustrates an IGSW monitoring task periodically executed by the CPU 40 operating in low power consumption mode.

Specifically, in step S510, the CPU 40 determines whether the ignition switch 5 is in on state based on the level of the IGSW signal input thereto in step S510.

When it is determined that the ignition switch 5 is in off state (the determination in step S510 is NO), the CPU 40 exits the IGSW monitoring task.

Otherwise when it is determined that the ignition switch 5 is in on state (the determination in step S510 is YES), the CPU 40 proceeds to step S520.

In step S520, the CPU 40 executes the clock-frequency switching task in FIG. 4 or that in FIG. 5. Like the second modification of the first embodiment, the CPU 40 can be programmed to perform the operations in step S330 after the operations in step S230 and before the operations in step S240 (see FIG. 4). As well as the third modification of the first embodiment, the CPU 40 can be programmed to perform the operations in step S330 after the operations in step S220 and before the operations in step S230 (see FIG. 4).

As described above, in the ECU 1A according to the second embodiment, even if a malfunction occurs in the reset-signal output unit 84, which causes the reset-signal output unit 84 not to output the reset signal with the active level, the CPU 40 can detect the occurrence of such a malfunction. Then, the CPU 40 can determine that the microcomputer 2 need operate in low power consumption mode, shifting from normal operation mode into low power consumption mode. For this reason, it is possible to reliably reduce current drain in the microcomputer 2.

Moreover, in the ECU 1A according to the second embodiment, when a malfunction occurs in the reset-signal output unit 84, which causes the reset-signal output unit 84 not to output the reset signal with the active level, the CPU 40 can provide notification indicative of the occurrence of a malfunction occurred in the reset-signal output unit 84 to, for example, users (vehicle's occupant(s)) or maintenance technicians.

This allows users or maintenance technicians to correct the malfunction occurred in the reset-signal output unit 84 or replace the reset-signal output unit into new one. This makes it possible to prevent the life of the battery serving as the power source of the ECU 1 from being reduced.

In addition, in the event of a malfunction occurring in the reset-signal output unit 84, the CPU 40 is configured to store, in the EEPROM 70, information representing that a malfunction has occurred in the reset-signal output unit 84. Thus, when the life of the battery is reduced, readout of the information stored in the EEPROM 70 allows a cause of the malfunction to be easily identified.

In the first and second embodiments and their modifications, the ECU 1, 1A is equipped with one microcomputer 2, but the present invention is not limited to the structure. When a plurality of microcomputers have been installed in an ECU, the present invention can be applied to the ECU composed of the plurality of microcomputers.

In the first and second embodiments, when the reset signal is turned high or the ISGW signal is turned low, the CPU 40 of the microcomputer 1, 1A is shifted from normal operation mode to low power consumption mode to disable the oscillator circuit 28, but the present invention is not limited to the structure.

Specifically, for example, in the tenth from the top in FIG. 2 or FIG. 8, when the reset signal is turned low at time t1 or the ISGW signal is turned low at time T1, the CPU 40 of the microcomputer 1, 1A can be configured to selectively use another operating voltage that is lower than the operating voltage Vo in place of the operating voltage Vo.

Moreover, when the reset signal is turned low at time t1 or the ISGW signal is turned low at time T1, the CPU 40 of the microcomputer 1, 1A can be configured to disable another at least one component in the microcomputer 1, 1A in addition to or in place of disabling the oscillator circuit 28.

In addition, those skilled in the art will appreciate that the present invention is capable of being distributed as program products, for example, the programs P stored in the ROM 42 in a variety of forms. It is also important to note that the present invention applies equally regardless of the particular type of signal bearing media used to actually carry out the distribution. Examples of suitable signal bearing media include recordable type media such as CD-ROMs and DVD-ROMs, and transmission type media such as digital and analog communications links.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A microcomputer for executing at least one task in normal operation mode, the microcomputer comprising:

a reset pin, the microcomputer being configured to be reset upon a reset signal with an active level being inputted to the reset pin;

a first clock generator configured to generate a first clock with a first frequency, the microcomputer operating on the first clock as its operation clock;

a disabling unit electrically connected to the reset pin and configured to disable the first clock generator in response to the reset signal with the active level being inputted to the reset pin so that the microcomputer is in shutdown state;

a second clock generator configured to continuously generate a second clock with a second frequency while being activated, the second frequency being lower than the first frequency;

a first switching unit configured to switch an operation clock of the microcomputer from the first clock to the second clock upon the reset signal input to the reset pin being shifted from the active level to an inactive level so that the microcomputer is shifted from the shutdown state to second-clock operation state in which the microcomputer operates on the second clock;

an enabling unit electrically connected to the reset pin and configured to enable the first clock generator to start the generation of the first clock in response to a shift of the reset signal being inputted to the reset pin from the active level to the inactive level; and a second switching unit configured to determine whether the first clock generated by the first clock generator is stable and switch the operation clock of the microcomputer from the second clock to the first clock when it is determined that the first clock generated by the first clock generator is stable so that the microcomputer is shifted from the second-clock operation state to first-clock operation state in which the microcomputer operates on the first clock.

2. A microcomputer according to claim 1, further comprising a first clock counter configured to count every period of the first clock, wherein the second switching unit is configured to determine that the first clock generated by the first clock generator is stable to switch the operation clock of the microcomputer from the second clock to the first clock when a count value of the first clock counter has become equal to or greater than a predetermined threshold value since the start of the generation of the first clock by the first clock generator.

3. A microcomputer according to claim 2, further comprising a second clock counter configured to count every period of the second clock, wherein each of the first clock counter and the second clock counter is configured to start counting upon start of the generation of the first clock by the first clock generator, and the second switching unit is configured to:

determine whether a ratio between the count value of the first clock counter and a count value of the second clock counter lies within a predetermined allocable range when a predetermined period has elapsed since the start of the generation of the first-clock by the first clock generator; and switch the operation clock of the microcomputer from the second clock to the first clock when it is determined that the ratio between the count value of the first clock counter and the count value of the second clock counter lies within the predetermined allocable range.

4. A microcomputer according to claim 1, further comprising:

a first determining unit configured to determine whether the microcomputer allows operation in low power consumption mode based on at least one of information associated with an operating condition of the microcomputer and information associated with an externally entered signal; and a shifting unit configured to shift the operation mode of the microcomputer from a normal operation mode into the low power consumption mode when it is determined that the microcomputer allows operation in the low power consumption mode.

5. An electronic control unit comprising:

a microcomputer recited in claim 1, the microcomputer executing control of a target device as the at least one task;

a determining unit operatively connected to the microcomputer and configured to determine:

whether a malfunction occurs in the microcomputer; and whether the microcomputer needs to execute control of the target device based on at least one of information associated with an operating condition of the microcomputer and information associated with an externally entered signal; and a reset-signal output unit electrically connected to the reset pin and configured to output the reset signal with the active level to the microcomputer via the reset pin at least one of when it is determined that the malfunction occurs in the microcomputer and when the microcomputer does not need to execute control of the target device.

6. An electronic control unit comprising:

a microcomputer recited in claim 4, the microcomputer executing control of a target device as the at least one task;

a second determining unit operatively connected to the microcomputer and configured to determine:

whether a malfunction occurs in the microcomputer; and whether the microcomputer needs to execute control of the target device based on the determination result of the first determining unit of the microcomputer; and a reset-signal output unit electrically connected to the reset pin and configured to output the reset signal with the active level to the microcomputer via the reset pin at least one of when it is determined that the malfunction occurs in the microcomputer and when the microcomputer does not need to execute control of the target device.

7. An electronic control unit according to claim 6, wherein the microcomputer includes a third determining unit operatively connected to the reset-signal output unit and configured to determine whether a malfunction occurs in the reset-signal output unit, the first determining unit of the microcomputer being configured to determine that the microcomputer allows operation in the low power consumption mode when it is determined that a malfunction occurs in the reset-signal output unit.

8. An electronic control unit according to claim 7, further comprising:

a warning unit configured to, when it is determined that a malfunction occurs in the reset-signal output unit, give a warning of occurrence of a malfunction in the reset-signal output unit.

9. An electronic control unit according to claim 7, further comprising:

a storing unit configured to, when it is determined that a malfunction occurs in the reset-signal output unit, store therein information indicative of the occurrence of a malfunction has occurred in the reset-signal output unit.

10. An electronic control unit according to claim 6, wherein the electronic control unit, the target device, and an ignition switch are installed in a vehicle, and the first determining unit determines that the microcomputer allows operation in the low power consumption mode based on the information associated with a signal sent from the ignition switch as the externally input signal, the signal sent from the ignition switch represents off-state thereof.

* * * * *